(12) United States Patent
Nakagawa et al.

(10) Patent No.: US 9,334,903 B2
(45) Date of Patent: May 10, 2016

(54) ROTATION TRANSMITTING MEMBER, COUPLING DIRECTLY CONNECTED TO SHAFTS, AND SHAFT CONNECTING MECHANISM

(71) Applicant: OILES CORPORATION, Tokyo (JP)

(72) Inventors: Noboru Nakagawa, Fujisawa (JP); Masaya Kinjyo, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/365,990

(22) PCT Filed: Nov. 9, 2012

(86) PCT No.: PCT/JP2012/079075
§ 371 (c)(1),
(2) Date: Jun. 16, 2014

(87) PCT Pub. No.: WO2013/118360
PCT Pub. Date: Aug. 15, 2013

(65) Prior Publication Data
US 2014/0369745 A1 Dec. 18, 2014

(30) Foreign Application Priority Data
Feb. 7, 2012 (JP) ................................. 2012-024553

(51) Int. Cl.
*F16D 3/50* (2006.01)
*F16D 1/06* (2006.01)
*F16D 3/12* (2006.01)
*F16D 3/68* (2006.01)

(52) U.S. Cl.
CPC .. *F16D 1/06* (2013.01); *F16D 3/12* (2013.01); *F16D 3/50* (2013.01); *F16D 3/68* (2013.01); *Y10T 403/27* (2015.01); *Y10T 403/7039* (2015.01)

(58) Field of Classification Search
CPC ............... F16D 1/06; F16D 3/12; F16D 3/50; F16D 3/68; Y10T 403/27; Y10T 403/7039
USPC ............ 464/71, 72, 89, 91, 138, 160; 403/41, 403/226, 227
See application file for complete search history.

(56) References Cited

U.S. PATENT DOCUMENTS

| 1,733,771 | A | * | 10/1929 | Baker ............................ 464/91 |
| 2,348,071 | A | * | 5/1944 | Mcc Johnstone ......... 464/160 X |
| 4,551,115 | A | * | 11/1985 | Ferguson .................. 464/160 X |
| 6,712,429 | B2 | * | 3/2004 | Villarroel |

FOREIGN PATENT DOCUMENTS

| JP | 60-180783 U | 11/1985 |
| JP | 2007232095 A | 9/2007 |
| JP | 2009014154 A | 1/2009 |
| JP | 2009138886 A | 6/2009 |
| JP | 2010-164162 A | 7/2010 |

* cited by examiner

*Primary Examiner* — Gregory Binda
(74) *Attorney, Agent, or Firm* — patenttm.us

(57) ABSTRACT

A more durable rotation transmitting member for a coupling directly connected to shafts has: drive-side rotation transmitting cushion to which an input shaft is directly connected; and a hub to which an output shaft is directly connected. Two parallel flat surfaces are formed on the outer periphery of the front end of the input shaft, and a shaft hole receives the front end of the input shaft and is formed in the rotation transmitting cushion. Surfaces of the inner wall of the shaft hole protrude toward the axis (O) to face input shaft front end flat surfaces. Each protruding surface comprises two flat sloped surfaces extending in the direction of the axis (O). When the input shaft starts to rotate, each front end flat of the front end comes into surface contact with one of the protruding surface sloped surfaces which faces the flat surface.

18 Claims, 6 Drawing Sheets

ROTATION TRANSMITTING MEMBER, COUPLING DIRECTLY CONNECTED TO SHAFTS, AND SHAFT CONNECTING MECHANISM

TECHNICAL FIELD

The present invention relates to a coupling that transmits torque applied to one rotating shaft to the other rotating shaft, and particularly to structure of a rotation transmitting member used in a direct-shaft-connection type coupling that is directly connected to rotating shafts.

BACKGROUND ART

There is known a coupling that transmits torque applied to an input shaft to an output shaft. For example, a coupling for an electric power steering is placed between an input shaft connected to an electric motor and an output shaft connected to a steering wheel, to transmit output torque of the electric motor to the steering wheel.

The below-mentioned Patent Literature 1 discloses a coupling comprising: a first hub (connection base), which is fitted to an end of an input shaft connected to an electric motor or the like; a second hub (connection base), which is fitted to an end of an output shaft connected to a steering wheel or the like; and a spacer (rotation transmitter), which is placed between the first and second hubs. The first and second hubs are connected with each other via the spacer, so that torque is transmitted from the input shaft to the output shaft. Here, as the spacer, is used an insert-molded part obtained by uniting a first rotation transmitting member of metal or hard resin, and a second rotation transmitting member of rubber elastic body to cover the first rotation transmitting member.

CITATION LIST

Patent Literature

Patent Literature 1: Japanese Unexamined Patent Application Laid-Open No. 2010-164162

SUMMARY OF INVENTION

Technical Problem

To respond to request for miniaturization, necessity for placement in a limited space, and the like, structure is proposed, in which the first hub is omitted from the coupling described in the Patent Literature 1. In a rotation transmitting member used in a coupling of such structure, a shaft hole is formed such that the inner wall of the shaft hole has two flat surfaces parallel to each other. An input shaft has at its end portion two flat surfaces to face the respective flat surfaces of the shaft hole, and this input shaft is inserted into the shaft hole. By this connection between the input shaft having the flat surfaces and the rotation transmitting member provided with the shaft hole having the flat surfaces, torque can be transmitted from the input shaft to the output shaft without using the first hub. Hard resin such as polyacetal resin, polyamide resin or the like, which has high strength among resin materials, is used as a material of the rotation transmitting member used in the direct-shaft-connection type coupling having the structure in which load from the input shaft is directly received by the shaft hole of the rotation transmitting member. The fit between the shaft hole of the rotation transmitting member and the input shaft is a clearance fit in order to prevent transmission of minute vibration and the like of the input shaft to the output shaft. In general, as a fit between a shaft member (such as a pin) and a hole, owing to their dimensional relation, there are a tight fit in which interference arises between the shaft member and the hole, a clearance fit in which clearance arises between the shaft member and the hole, and a transition fit that falls between them.

However, as shown in FIG. 6, in the case where a clearance fit is employed as the fit between flat surfaces 71 of an input shaft 7 and a width-across-flat shaft hole of a rotation transmitting member 8 of a direct-shaft-connection type coupling, a clearance d is formed between the width-across-flat shaft hole 80 of the rotation transmitting member 8 and the flat surfaces 71 of the input shaft 7, and this causes the following phenomenon. That is to say, when the input shaft 7 rotates about the axis O, mainly the edge portion 73 of each flat surface 71 of the input shaft 7 contacts partially with an inner wall 81 of the width-across-flat shaft hole 8. When the inner wall 81 of the width-across-flat shaft hole 80 of the rotation transmitting member 8 wears partially because of the above phenomenon, the shaft hole 80 of the rotation transmitting member 8 reduces an area for receiving the load transmitted from the input shaft 7. This increases the stress applied to the shaft hole 80 of the rotation transmitting member 8. By this, the durability of the rotation transmitting member 8 and the durability of the direct-shaft-connection type coupling using the rotation transmitting member 8 may be reduced. Further, owing to creep deformation or the like of the shaft hole 80 of the rotation transmitting member 8, the backlash between the shaft hole 80 and the input shaft 7 becomes larger, and torque transmission efficiency becomes lower. Further, the use of this coupling in a steering device or the like of an automobile makes a driver feel discomfort about handling performance.

The present invention has been made in view of the above circumstances. An object of the invention is to realize high durability of a rotation transmitting member for a direct-shaft-connection type coupling and to realize high durability of a shaft connecting mechanism using the direct-shaft-connection type coupling.

Solution to Problem

To solve the above problems, a first aspect of the present invention provides a rotation transmitting member for a direct-shaft-connection type coupling, wherein: in an inner wall are of a shaft hole, which is opposed to a flat surface formed on an outer periphery surface of an end portion of a shaft to be inserted into the shaft hole of the rotation transmitting member, there are formed two inclined surfaces inclined inward in a radial direction of the shaft hole from both end portions of the inner wall area to a center of the inner wall area, along a trust direction of the shaft inserted into the shaft hole, so that these inclined surfaces come in surface contact with the flat surface formed on the outer periphery surface of the end portion of the shaft.

For example, the present invention provides a rotation transmitting member, which is attached to an end of one shaft of an input shaft and an output shaft both rotating about an axis, and which engages with a hub attached to an end of the other shaft of the input shaft and the output shaft, wherein:

the rotation transmitting member has a shaft hole into which the one shaft having at least one flat surface on an outer periphery surface of an end portion of the one shaft is inserted; and in an inner wall area of the shaft hole which is opposed to the flat surface, there are formed two inclined surfaces inclined inward in a radial direction of the shaft hole from both end portions of the inner wall area to a center of the inner wall area, along an axis of the one shaft.

Further, a second aspect of the present invention provides a shaft connection mechanism using a direct-shaft-connection type coupling, wherein: a flat surface is formed on the inner wall of a shaft hole of a rotation transmitting member used for the direct-shaft-connection type coupling, and in an area of the outer periphery surface of an end portion of a shaft to be inserted into the shaft hole of the rotation transmitting member, the area opposed to the flat surface formed on the inner wall of the shaft hole of the rotation transmitting member, there are formed two inclined surfaces inclined outward in a radial direction of the shaft from both end portions of the area to a center of the area, along an axis of the shaft, so that these inclined surfaces come in surface contact with the flat surface formed on the inner wall of the shaft hole of the rotation transmitting member.

For example, the present invention provides a shaft connection mechanism comprising: an input shaft and an output shaft both rotating about an axis; and a direct-shaft-connection type coupling for transmitting torque from the input shaft to the output shaft, wherein:

the direct-shaft-connection type coupling comprises:

a rotation transmitting member in which a shaft hole is formed for inserting an end portion of one shaft of the input shaft and the output shaft; and a hub which is attached to an end of the other shaft of the input shaft and the output shaft and engages with the rotation transmitting member;

a flat surface is formed on an inner wall of the shaft hole; and in an area of an outer periphery surface of the end portion of the one shaft, the area opposed to the flat surface formed on the inner wall of the shaft hole, there are formed two inclined surfaces inclined outward in a radial direction of the one shaft from both end portions of the area to a center of the area, along an axis of the one shaft.

Advantageous Effects of Invention

According to the first aspect of the present invention, the flat surface formed at the end portion of the input shaft or the output shaft each rotating about the axis is received in surface contact by one of the two inclined surface formed on the inner wall of the shaft hole of the rotation transmitting member. According to the second aspect of the present invention, one of the two inclined surfaces formed at the end portion of the input shaft or the output shaft each rotating about the axis is received in surface contact by the flat surface formed on the inner wall of the rotation transmitting member. Therefore, it is possible to prevent local wear of the inner wall of the shaft hole and aging degradation of the torque transmission characteristics. Thus, it is possible to realize high durability of the rotation transmitting member for the direct-shaft-connection type coupling and high durability of the shaft connection mechanism using the direct-shaft-connection type coupling.

DESCRIPTION OF EMBODIMENTS

Figure 1:
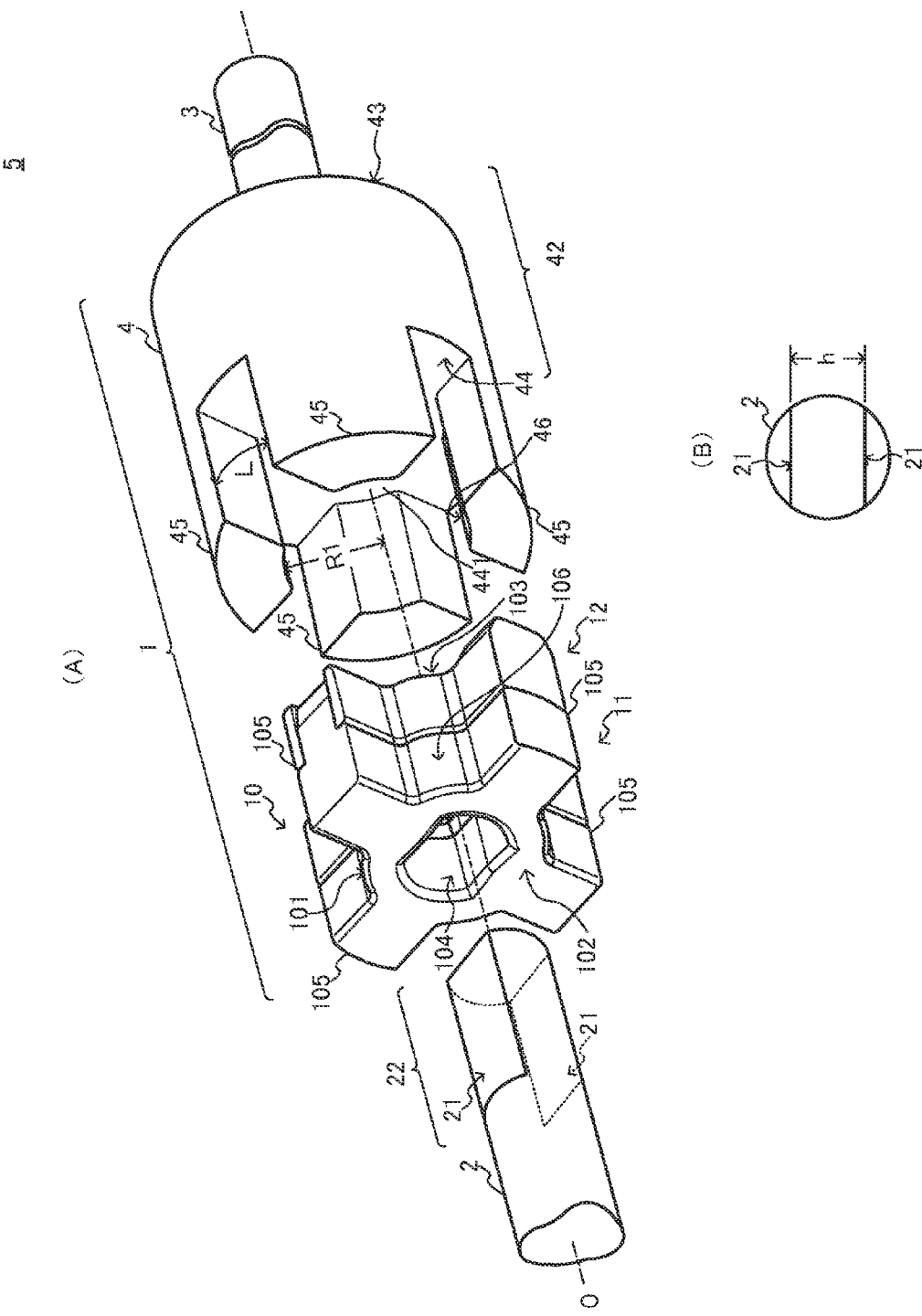
FIG. 1(A) is a schematic view showing a configuration of a shaft connecting mechanism 5 which uses a direct-shaft-connection type coupling 1 according to one embodiment of the present invention.
FIG. 1(B) is a cross-section view of an end portion 22 of an input shaft 2 that is connected to a rotation transmitting cushion 10.

In the following, one embodiment of the present invention will be described referring to the drawings.

Figure 2:
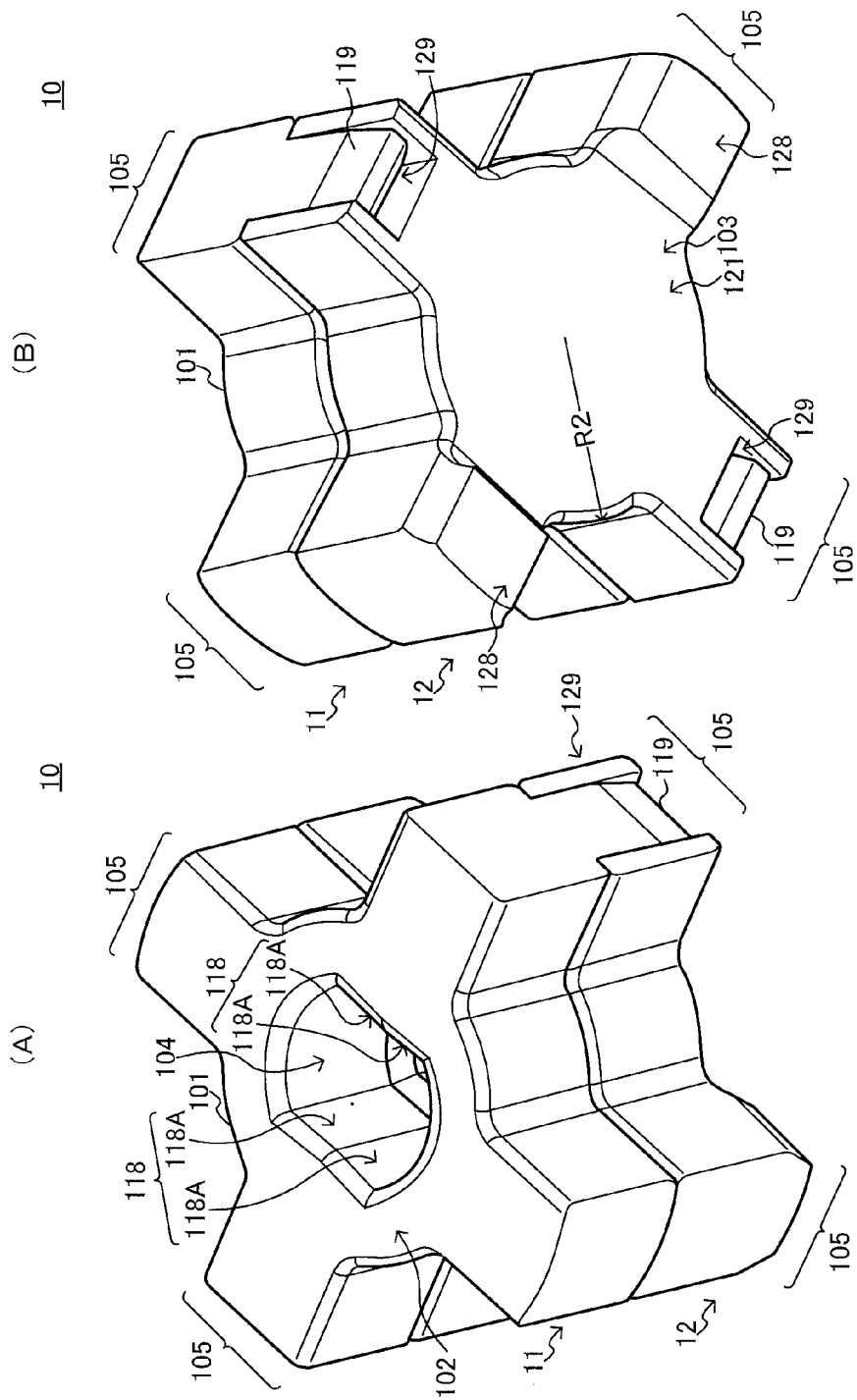
FIGS. 2(A) and 2(B) are external views showing the rotation transmitting cushion 10.

FIG. 1(A) is a schematic view showing a configuration of a shaft connecting mechanism 5 which uses a direct-shaft-connection type coupling 1 according to the present embodiment, and FIG. 1(B) is a cross-section view of an end portion 22 of an input shaft 2 which is directly connected to a rotation transmitting cushion 10. Further, FIGS. 2(A) and 2(B) are external views of the rotation transmitting cushion 10.

In the shaft connecting mechanism 5 shown in FIG. 1(A), the direct-shaft-connection type coupling 1 according to the present embodiment is placed between the input shaft 2 connected to a driving source (not shown) such as an electric motor and an output shaft 3 connected to a driven object (not shown) such as a steering wheel, and transmits output torque of the driving source to the driven object. In detail, this direct-shaft-connection type coupling 1 comprises: the rotation transmitting cushion 10 located at the driving side to which the input shaft 2 is directly connected; and a hub 4 located at the driven side to which the output shaft 3 is directly connected. The direct-shaft-connection type coupling 1 transmits rotation of the input shaft 2 to the output shaft 3 by engagement between the below-described arm portions 105 of the rotation transmitting cushion 10 and the below-described protruding portions 45 of the hub 4. Here, as shown in FIG. 1(B), two flat surfaces 21 opposite to each other at a prescribed width-across-flat h are formed on the outer periphery of the end portion 22 of the input shaft 2.

The hub 4 has: a cylindrical portion 42, in which an end portion of the output shaft 3 is connected on the side of one end surface 43; and four protruding portions 45, which protrude along the axis O toward the input shaft 2 from the other end surface 44 of the cylindrical portion 42. The four protruding portions 45 are arranged at almost regular angular intervals around the axis O so as to surround a center area 441 of the other end surface 44 of the cylindrical portion 42. And the four protruding portions 45 grasp the rotation transmitting cushion 10. Although the present embodiment takes the example of the hub 4 having the four protruding portions 45, the number of the protruding portions 45 of the hub 4 can be changed suitably.

On the other hand, the rotation transmitting cushion 10 has: a boss portion 101, in which the end portion 22 of the input shaft 2 is connected on the side of one end surface 102; and four arm portions 105 protruding radially outward from the outer periphery 106 of the boss portion 101.

The boss portion 101 has the radius R2 smaller than the distance R1 between the inner periphery surface 46 of the protruding portions 45 of the hub 4 and the axis O. The boss portion 101 is received from the side of the other end surface 103 into the center area 441 of the other end surface 44 of the hub 4, so as to be grasped by the protruding portions 45 of the hub 4. Further, in the one end surface 102 of the boss portion 101, is formed a bottomed shaft hole 104 into which the end portion 22 of the input shaft 2 is fitted. On the inner wall of the bottomed shaft hole 104, are formed convex surfaces 118 which protrude toward the axis O in a radial direction and face the flat surfaces 21 of the end portion 22 of the input shaft 2, as described below.

The arm portions 105 whose number is the same as the protruding portions 45 of the hub 4 are formed on the outer periphery surface 106 of the boss portion 101 at almost regular angular intervals around the axis O. In the state that the boss portion 101 is received in the center area 441 on the side of the other end surface 44 of the hub 4, these arm portions 105 are each received between adjacent protruding portions 45 of the hub 4, so as to engage with the protruding portions 45 of the hub 4. Due to this engagement between the arm portions 105 of the rotation transmitting cushion 10 and the protruding portions 45 of the hub 4, the hub 45 rotates interlocking with rotation of the rotation transmitting cushion 10.

Here, the rotation transmitting cushion 10 has two-layer stacking structure in which two outer plates 11 and 12 formed of materials having different elastic coefficients are superposed in the direction of the axis O. In detail, the rotation transmitting cushion 10 comprises a first outer plate 11 located at the side of the input shaft 2 and a second outer plate 12 located at the side of the output shaft 3. The first outer plate 11 is formed of hard resin such as polyacetal resin, polyamide resin or the like, and the second outer plate 12 is formed of an elastic member of such as gum, elastmeric resin or the like having a lower elastic coefficient than that of the material of the first outer plate 11. These two types of outer plates 11 and 12 are joined in a snap-fit manner, so as to make up the rotation transmitting cushion 10 as a unit.

FIGS. 3(A) and 3(B) are a front view and a back view of the first outer plate 11, FIGS. 3(C) and 3(D) are an A-A cross-section view and a B-B cross-section view of FIG. 3(A), and FIG. 3(E) is an enlarged view of the part C of FIG. 3(B).

Figure 3:
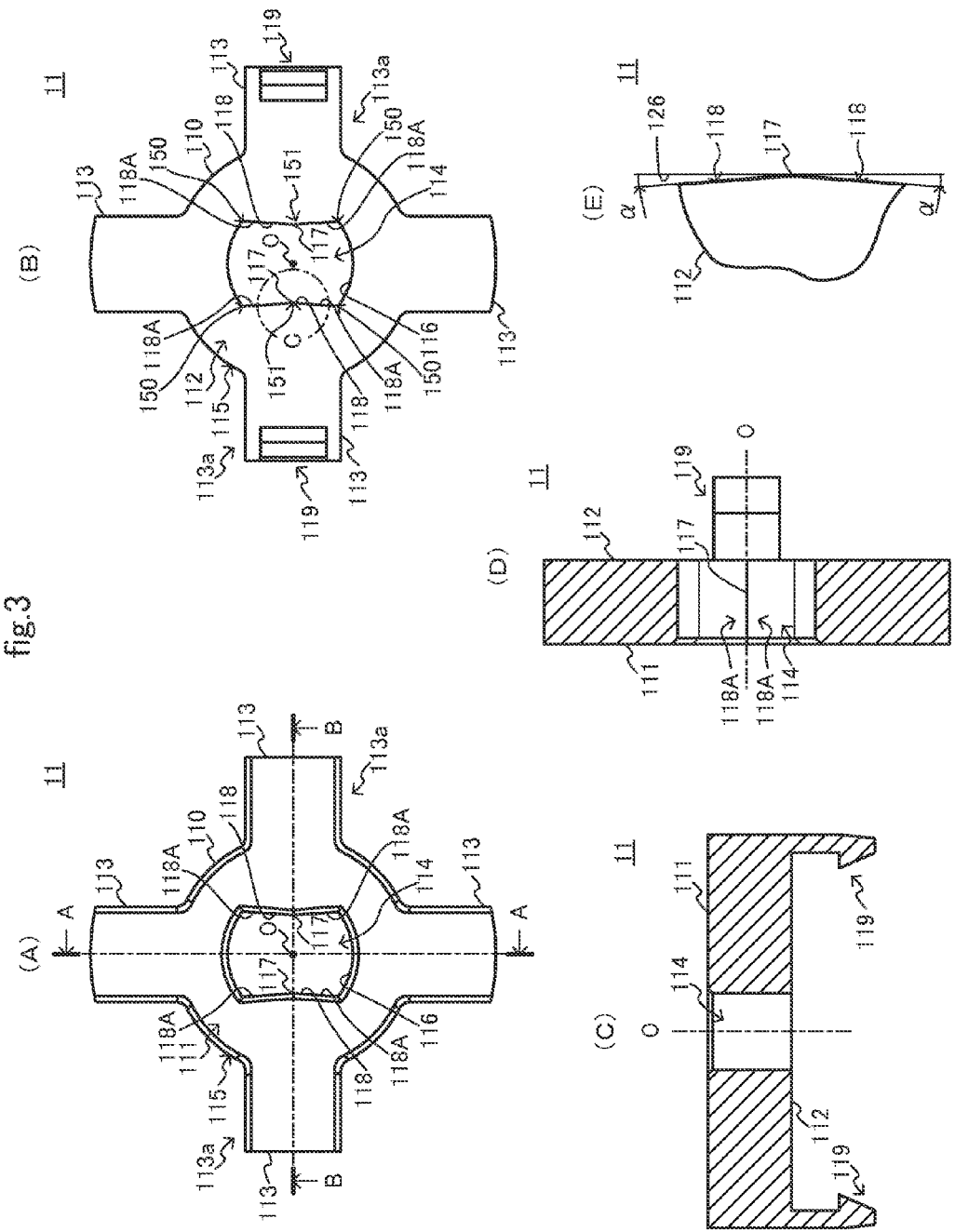
FIGS. 3(A) and 3(B) are a front view and a back view showing a first outer plate 1.
FIGS. 3(C) and 3(D) are an A-A cross-section view and a B-B cross-section view of FIG. 3(A)
FIG. 3(E) is an enlarged view of the part C of FIG. 3(B)

Relative to the second outer plate 12, the first outer plate 11 is positioned at the side of the input shaft 2. As shown in FIG. 3, the first outer plate 11 has: a plate body 110 of a disk shape; and four arm portions 113, which protrude in a radially-outward direction from the outer periphery 115 of the plate body 110. When both outer plates 11 and 12 are superposed such that one surface 112 of the first outer plate 11 and one surface 122 of the second outer plate 12 are opposed each other, the plate body 110 is superposed in the direction of axis O on the below-described plate body 120 of the second outer plate 12, so as to form the boss portion 101 of the rotation transmitting cushion 10. Further, the four arm portions 113 are provided on the outer periphery surface 115 of the plate body 110 at almost regular angular intervals around the axis O, and are superposed in the direction of axis O on the corresponding below-described arm portions 125 of the second outer plate 12, so as to form the arm portions 105 of the rotation transmitting cushion 10. Although, in the present embodiment, the four arm portions 113 are provided on the outer periphery surface 115 of the plate body 110 at regular angular intervals, the number of arm portions 113 provided on the outer periphery surface 115 of the plate body 110 is determined by the number of arm portions 105 which is to be formed for the rotation transmitting cushion 10.

In the plate body 110, is formed a through-hole 114 which passes through from the one end surface 112 to the other end surface 111 such that the axis O of the plate body 110 becomes the axis of the through-hole 114. This through-hole 114 is connected with the below-described bottomed hole 124 formed in the second outer plate 12, so as to form the bottomed shaft hole 104 of the rotation transmitting cushion 10.

The through-hole 114 is formed such that its dimensions realize a clearance fit for the end portion 22 of the input shaft 2. Further, on the inner wall 116 of the through-hole 114, two convex surfaces 118 which protrude toward the axis O are formed. The two convex surfaces 118 are opposed respectively to the two flat surfaces 21 forming the width-across-flat h of the end portion 22 of the input shaft 2 which is to be inserted into the through-hole 114. Each of these convex surfaces 118 is made up of two inclined surfaces 118A. The two inclined surfaces 118A are inclined inward in a radial direction of the through-hole 114, from both edge portions 150 of the inner wall 116 to the central portion 151 of the inner wall 116, along the direction of axis O. That is to say, each convex surface 118 is made up of the two inclined surfaces 118A along the direction of axis O, which form a prescribed angle, so that a ridge line 117 along the direction of axis O is formed. As shown in FIG. 3(E), in the present embodiment, when the first outer plate 11 and the second outer plate 12 are superposed, the inclination a of the inclined surfaces 118A with respect to a flat surface 126 of the bottomed hole 124 of the second outer plate 12 is set to about one degree. Although, in the present embodiment, the boundary between the two adjacent inclined surfaces 118A is the ridge line 117, the boundary between the two adjacent inclined surfaces 118A may be rounded. Or, the boundary may have a shape obtained by cutting the boundary portion including the ridge line 117 between both inclined surfaces 118A, namely, a shape in which the two inclined surfaces 118A are adjacent through a flat surface.

At the end portions of two arm portions 113a opposed to each other through the through-hole 114, are formed respective hook-like snap-fit portions 119 for connecting with the below-described engaging portions 129 of the second outer plate 12. By providing the snap-fit portions 119 at such two positions, the direction of the through-hole 114 can be conformed with the direction of the below-described bottomed hole 124 of the second outer plate 12 only by fitting the snap-fit portions 119 to the respective engaging portions 129 of the second outer plate 12. Although, in the present embodiment, the snap-fit portions 119 are formed at the two arm portions 113a out of the four arm portions 113, the number of arm portions 113 at which snap-fit portions are formed can be determined depending on required coupling strength between the first and second outer plates 11 and 12. However, it is favorable to arrange the snap fit portions 119 so that the through-hole 114 is oriented in a prescribed direction when a plurality of snap fit portions 119 are positioned in a prescribed positional relation to a worker (i.e. so that the direction of the through-hole 114 can be identified by the positions of the snap fit portions).

FIGS. 4(A) and 4(B) are a front view and a back view of the second outer plate 12, and FIGS. 4(C) and 4(D) are a D-D cross-section view and an E-E cross-section view of FIG. 4(A).

Figure 4:
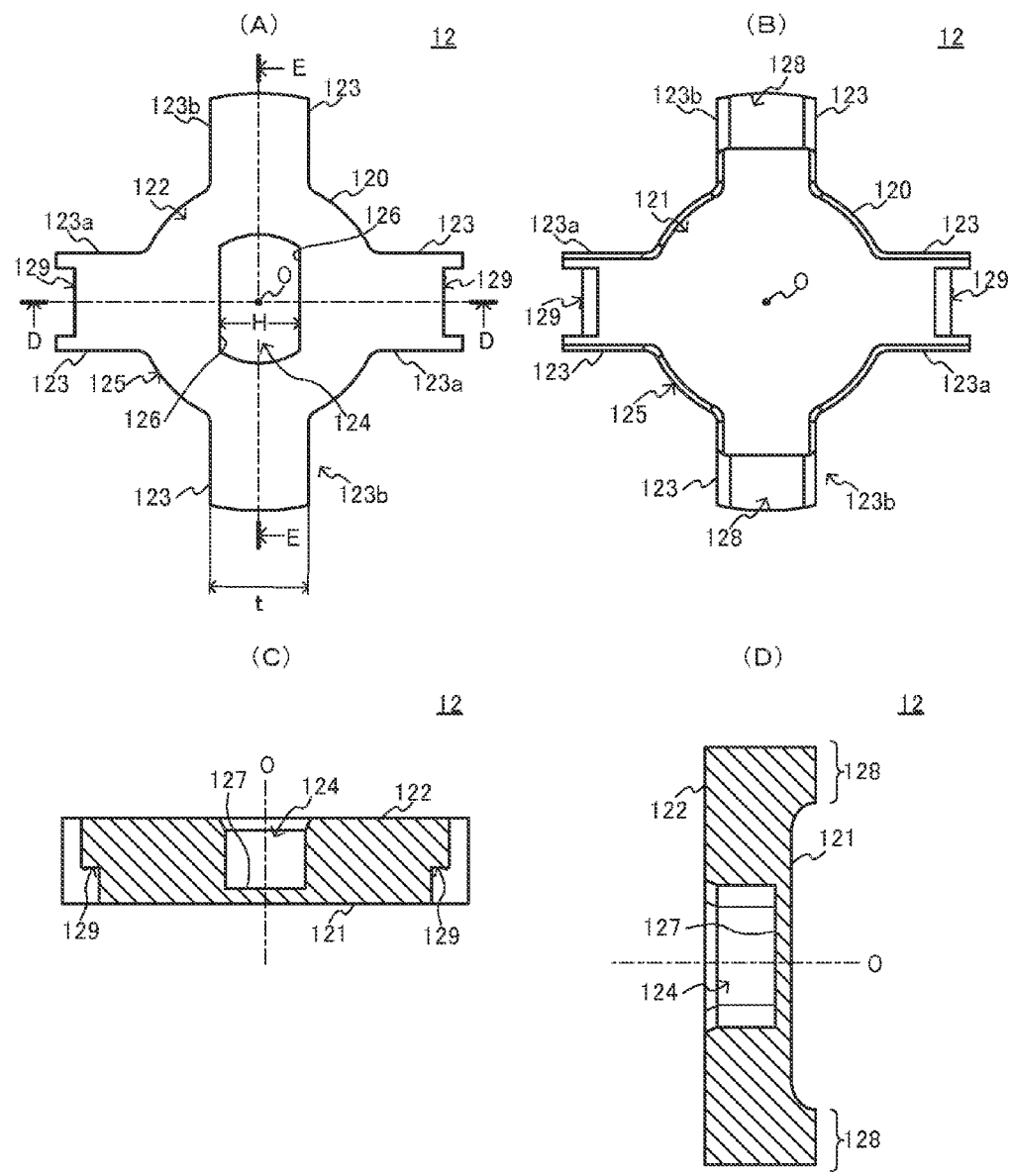
FIGS. 4(A) and 4(B) are a front view and a back view showing a second outer plate 12.
FIGS. 4(C) and 4(D) are a D-D cross-section view and an E-E cross-section view of FIG. 4(A)

Relative to the first outer plate 11, the second outer plate 12 is located at the side of the output shaft 3. As shown in FIG. 4, the second outer plate 12 has: a plate body 120 of a disk shape having the almost same diameter as that of the plate body 110 of the first outer plate 11; and arm portions 123, which protrude in a radial direction from the outer periphery surface 125 of the plate body 120, and the number of which is the same as the arm portions 113 of the first outer plate 11. As described above, when both of the outer plates 11 and 12 are superposed such that the one surface 122 of the second outer plate 12 and the one surface 112 of the first outer plate 11 are opposed to each other, the plate body 120 is superposed in the direction of axis O on the plate body 110 of the first outer plate 11, so as to form the boss portion 101 of the rotation transmitting cushion 10. Further, the four arm portions 123 are provided at almost regular angular intervals around the axis O so as to correspond to the arm portions 113 of the first outer plate 11, and are superposed in the direction of axis O on the corresponding arm portions 113 of the first outer plate 11, so as to form the arm portions 105 of the rotation transmitting cushion 10.

In the plate body 120, is formed the bottomed hole 124 which is open in the one surface 122, and has, as its axis, the axis O of the plate body 120. As described above, the bottomed hole 124 is connected with the through-hole 114 of the first outer plate 11, so as to form the bottomed shaft hole 104 of the rotation transmitting cushion 10. On the inner wall of the bottomed hole 124, are formed two flat surfaces 126 which are opposed to each other at a distance less than or equal to the distance between the convex surfaces 118 of the through-hole 114 of the first outer plate 11. For example, the width-across-flat H of the two flat surfaces 126 is narrower than the width-across-flat h of the end portion 22 of the input shaft 2. Accordingly, the end portion 22 of the input shaft 2 is fitted into the bottomed hole 124 of the plate body 120 of the second outer plate 12 without a clearance between the flat surfaces 21 of the end portion 22 of the input shaft 2 and the flat surfaces 126 of the bottomed hole 124 of the plate body 120 of the second outer plate 12, the flat surfaces 126 being opposed to the flat surfaces 21.

Among the four arm portions 123, the arm portions 123a, which correspond to the arm portions 113a having the snap-fit portions 119 in the first outer plate 11, have the engaging portions 129 formed at the end portions of the arm portions 1231, so as to engage with the respective snap-fit portions 119. In each of the other arm portions 123b, a buffer portion 128 protruding in the direction of axis O from the other surface 121 is formed so as to be abutted against the other end surface 44 of the cylindrical portion 42 of the hub 4. When the end portion 22 of the input shaft 2 is fitted into the bottomed hole 124 of the second outer plate 12 via the through-hole 114 of the first outer plate 11, the end portion 22 of the input shaft 2 pushes the bottom 127 of the bottomed hole 124 so that the second outer plate 12 bends about the two buffer portions 128 as fulcrums toward the hub 4. Thus, by pushing the hub 4 and the rotation transmitting cushion 10 toward the output shaft 3 and the input shaft 2, strong elastic force acts, so that backlash in the direction of axis O is suppressed and the output shaft 3 and the input shaft 2 can be surely connected by the direct-shaft-connection type coupling 1. Further, since such bending allows relative movement of the output shaft 3 and the input shaft 2 in the directions of axis O, it is possible to absorb vibration and shock in direction of axis O.

Here, the width t of the four arm portions 123 may be made slightly larger than the distance L between adjacent protruding portions 45 of the hub 4. In that case, the rotation transmitting cushion 10 is pressed and fitted into the hub 4.

When the one surface 112 of the first outer plate 11 and the one surface 122 of the second outer plate 12 are opposed to each other and the snap-fit portions 119 of the arm portions 113a of the first outer plate 11 are joined to the engaging portions 129 of the corresponding arm portions 123a of the second outer plate 12, then the plate body 110 of the first outer plate 11 and the plate body 120 of the second outer plate 12 are superposed in the direction of axis O, so as to form the boss portion 101 of the rotation transmitting cushion 10. Further, the arm portions 113 of the first outer plate 11 and the corresponding arm portions 123 of the second outer plate 12 are respectively superposed in the direction of axis O, so as to form the arm portions 105 of the rotation transmitting cushion 10. At that time, the through-hole 114 of the first outer plate 11 and the bottomed hole 122 of the second outer plate 12 are connected with each other, to form the bottomed shaft hole 104 of the rotation transmitting cushion 10.

As a result, this bottomed shaft hole 104 has different cross-section shapes and different elastic coefficients on the opening side (on the side of the input shaft 2) and on the bottom side (on the side of the hub 4). That is to say, on the inner wall on the bottom side (on the side of the hub 4), the two flat surfaces 126 opposed to each other are formed of the elastic member (the second outer plate 12), and the end portion 22 of the inserted input shaft 2 is elastically held by contact between the flat surfaces 126 and the two flat surfaces 21 of the end portion 22 of the input shaft 2. On the other hand, on the inner wall on the opening side (on the side of the input shaft 2), the convex surfaces 118 protruding toward the axis O are formed of the hard resin (the first outer plate 11). Each of these convex surfaces 118 has the ridge line 117 along the axis O at the almost same distance from the axis O to the flat surfaces 126 of the bottom side (the side of the hub 4), and is made up of the two flat inclined surfaces 118A along the axis O, which are symmetrical to each other about the ridge line 117.

In the rotation transmitting cushion 10 of the above-described configuration, when the input shaft 2 inserted in the bottomed shaft hole 104 rotates in accordance with output of the driving source, each of the two flat surfaces 21 of the end portion 22 of the input shaft 2 swings around the ridge line 117 of the convex surface 118 of the hard resin (the first outer plate 11), while deforming elastically the elastic member (the second outer plate 12) which makes the contacting flat surface 126, so as to come in contact with the whole area of one of the two inclined surfaces 118A making up the convex surface 118.

Thus, in the bottomed shaft hole 104, the two flat surfaces 21 of the end portion 22 of the input shaft 2 are already in surface contact with the flat surfaces 126 of the elastic member (the second outer plate 12) before the two flat surfaces 21 come in contact with the inclined surfaces 118A of the hard resin (the first outer plate 11). Therefore, the torque of the input shaft 2 is first transmitted to the second outer plate 12, and then transmitted through the arm portions 123 of the second outer plate 12 to the hub 4 that grasps the rotation transmitting cushion 10. Further, when the flat surfaces 21 having the width-across-flat h of the end portion 22 of the input shaft 2 elastically deform the elastic member (the second outer plate 12) which makes the flat surfaces 126, and come in contact with the inclined surfaces 118A of the hard resin (the first outer plate 11), then the torque of the input shaft 2 is mainly transmitted to the first outer plate 11. And then the torque of the input shaft 2 is transmitted through the arm portions 113 of the first outer plate 11 to the hub 4 grasping the rotation transmitting cushion 10.

Thus, in the bottomed shaft hole 104, the torque of the input shaft 2 is transmitted to the output shaft 3 through the second outer plate 12 until the flat surfaces 21 of the end portion 22 of the input shaft 2 come in contact with the inclined surfaces 118A of the first outer plate 11. After the flat surfaces 21 of the end portion 22 of the input shaft 2 come in contact with the inclined surfaces 118A of the first outer plate 11, the torque is transmitted to the output shaft 3 mainly through the first outer plate 11.

Hereinabove, an embodiment of the present invention has been described.

Figure 5:
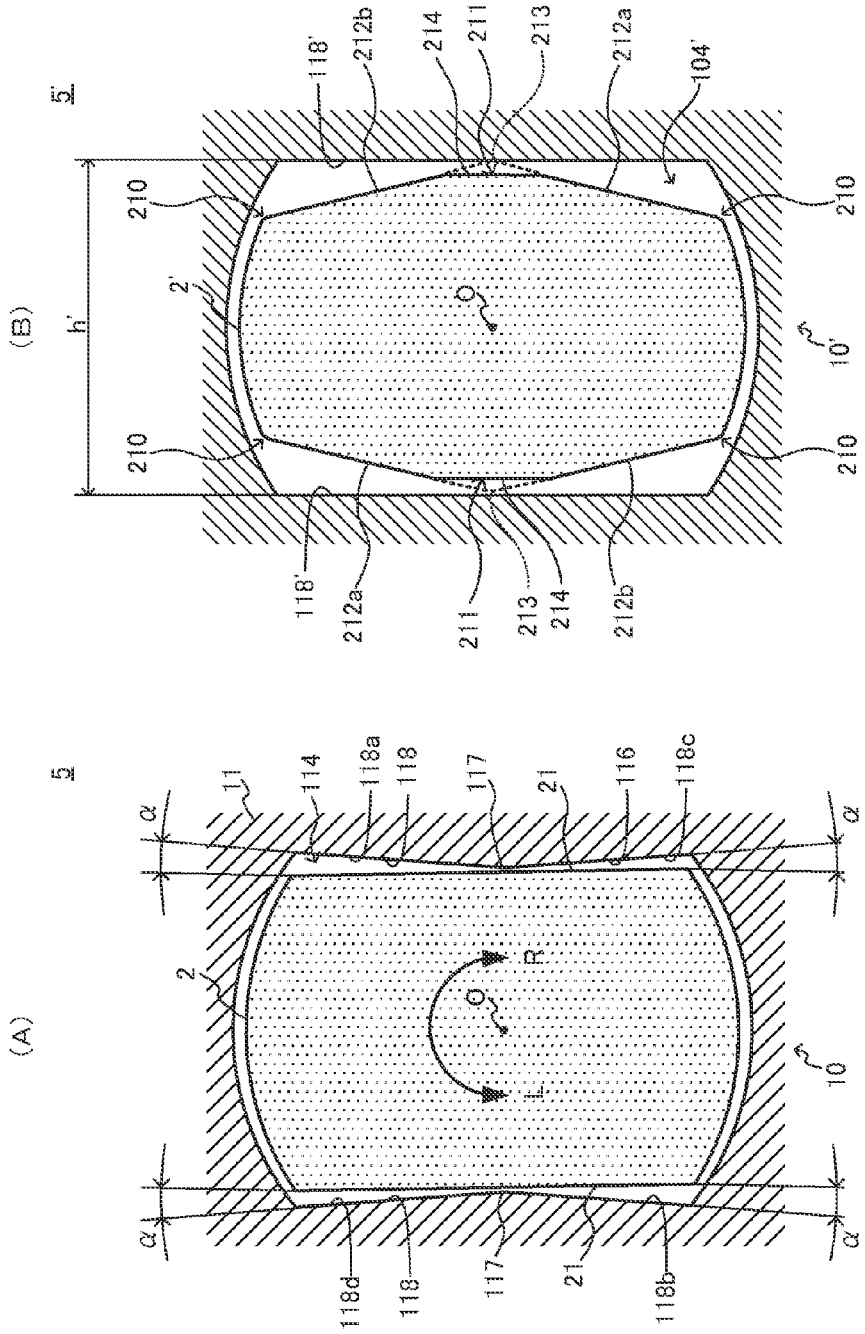
FIG. 5(A) is a view for explaining effects of the shaft connecting mechanism 5.
FIG. 5(B) is a view for explaining a variation 5' of the shaft connecting mechanism 5.
Figure 6:
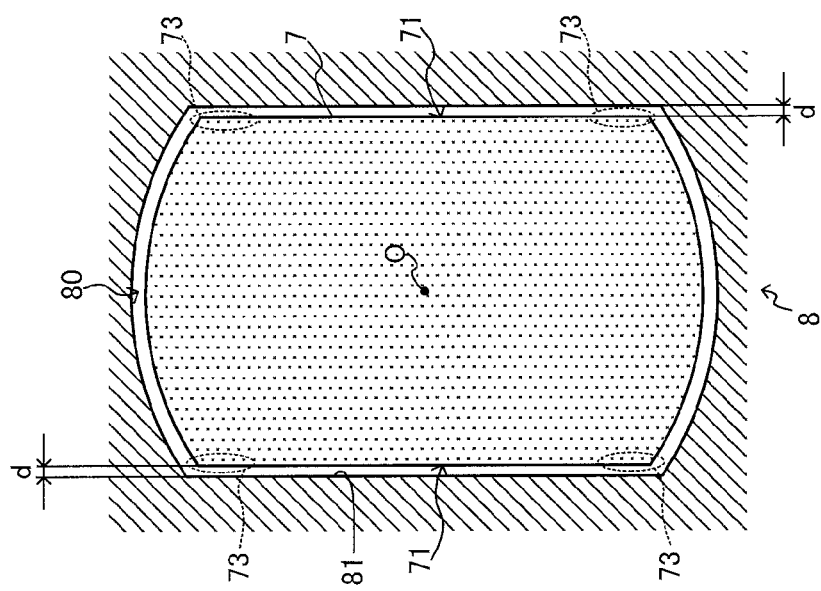
FIG. 6 is a view for explaining problems of the shaft connecting mechanism using the conventional shaft connecting mechanism.

In the present embodiment, on the inner wall 116 of the through-hole 114 of the first outer plate 11 formed of hard resin, there are formed the convex surfaces 118, each of which is made up of the two inclined surfaces 118A along the axis O forming a prescribed angle, so that the convex surfaces 118 are opposed to the respective flat surfaces 118A of the end portion 22 of the input shaft 2. Therefore, when the input shaft 2 rotates about the axis O, each flat surface 21 of the end portion 22 of the input shaft 2 can be received by the whole surface of one of the two inclined surfaces 118A which make up the convex surface 118 opposed to the flat surface 21. For example, in FIG. 5(A), when the input shaft 2 rotates in the direction R, the force applied from each flat surface 21 can be received by the whole area of one inclined surface 118a, 118b of the convex surface 118 opposed to the flat surface 21. And when the input shaft 2 rotates in the direction L, the force applied from each flat surface 21 can be received by the whole area of the other inclined surface 118d, 118d of the convex surface 118 opposed to the flat surface 21.

Thus, the present embodiment prevents partial contact of the edge portions of the flat surfaces 21 of the end portion 22 of the input shaft 2 with the inner wall 116 of the through-hole 114 of the first outer plate 11. As a result, it is possible to prevent local wear of the first outer plate 11, which becomes cause of aging degradation of the torque transmission characteristics. This improves the durability of the direct-shaft-connection type coupling 1.

Further, in the present embodiment, the rotation transmitting cushion 10 has the two-layer stacking structure of the first outer plate 1 formed of hard resin and the second outer plate 12 formed of the elastic member, and the width-across-flat H of the bottomed hole 124 of the second outer plate 12 is made narrower than the width-across-flat h of the end portion 22 of the input shaft 2. Thus, even before the two flat surfaces 21 formed at the end portion 22 of the input shaft 2 come in contact with the inclined surfaces 118A of the inner wall 116 of the through-hole 114 of the first outer plate 11, the torque of the input shaft 2 can be transmitted to the output shaft 3 through the second outer plate 12. This improves the initial motion characteristics of torque transmission. Further, elastic deformation of the second outer plate 12 formed of the elastic member absorbs micro vibration of the input shaft 2 in the range where the flat surfaces 21 are not in contact with any inclined surface 118A of the facing convex surfaces 118. Therefore, it is possible to prevent transmission of such vibration to the output shaft 3.

Further, after the two flat surfaces 21 formed at the end portion 22 of the input shaft 2 come in contact with some of the inclined surfaces 118A making up the convex surfaces 118 of the inner wall 116 of the through-hole 114 of the first outer plate 11, the torque of the input shaft 2 is transmitted to the output shaft 3 through the first outer plate 11. Therefore, elastic deformation of the second outer plate 12 accompanying rotation of the input shaft 2 can be suppressed less than a prescribed level. This prevents deterioration of the second outer plate 12 formed of the elastic member, and aging degradation of the torque transmission characteristics can be further prevented. Thus, it is possible to provide the direct-shaft-connection type coupling 1 having more superior durability.

Further, in the present embodiment, the bottomed hole 124 closed on the side of the hub 4 is formed in the second outer plate 12 formed of the elastic member. Thus, the bottom 127 of the bottomed hole 124 can prevent generation of abnormal noise caused by impact of the metal materials i.e. the end portion 22 of the input shaft 2 and the end surface 44 of the cylindrical portion 42 of the hub 4.

Further, in the present embodiment, among the plurality of arm portions 123 of the second outer plate 12, the arm portions 123b have the buffer portions 128 protruding relative to the other surface 121 of the plate body 120 toward the hub 4. In the arm portions 123b, the engaging portions 129 for engaging with the snap-fit portions 119 of the first outer plate 11 are not formed. Accordingly, when the end portion 22 of the input shaft 2 is pressed into the bottomed shaft hole 104 of the rotation transmitting cushion 10, the end portion 22 of the input shaft 2 pushes the bottom 12 of the bottomed hole 124 of the second outer plate 12 toward the hub 4. Therefore, the second outer plate 12 bends about the buffer portions 128 as fulcrums toward the hub 4, to generate larger reaction forces that press the rotation transmitting cushion 10 toward the input shaft 2 and the hub 4 toward the output shaft 3. As a result, the direct-shaft-connection type coupling 1 can surely connect the input shaft 2 and the output shaft 3.

Although, in the present embodiment, the two flat surfaces 21 are formed at the end portion 22 of the input shaft 2 to have the width-across-flat h, this is not necessary. For example, it is possible to provide the end portion 22 of the input shaft 2 with only one flat surface 21, and to form, on the inner wall of the shaft hole 104 of the rotation transmitting cushion 10, one convex surface 118 opposed to the flat surface 21 of the end portion 22 of the input shaft 2. Or, it is possible to provide the end portion 22 of the input shaft 2 with two flat surfaces forming a prescribed angle, and to form, on the inner wall of the shaft hole of the rotation transmitting cushion 10, convex surfaces opposed to these flat surfaces respectively.

Or, it is possible to form flat surfaces in place of the convex surfaces 118 on the inner wall of the shaft hole 104 of the rotation transmitting cushion 10, and to form, at the end portion 22 of the input shaft 2, convex surfaces which protrude outward in radial directions of the input shaft 2 and are opposed to the flat surfaces formed on the inner wall of the shaft hole 104, in place of the flat surfaces 21. For example, as in the shaft connecting mechanism 5' shown in FIG. 5(B), two flat surfaces 118' having a width-across-flat h' are formed on the inner wall of a shaft hole 104' of a rotation transmitting cushion 10'. Further, at the end portion (the portion corresponding to the end portion 22 of the input shaft 2 shown in FIG. 1(A)) of an input shaft 2', two inclined surfaces 212a and 212b inclined outward in a radial direction of an input shaft 22' from both edge portions 210 to the central portion 211 along the axis O of the input shaft 2' are formed in outer peripheral surfaces opposed respectively to the two flat surfaces 118' of the shaft hole 104'. Then, one of the two inclined surface 212a and 212b is made to come in surface contact with the flat surface 118' concerned out of the two flat surfaces 118' formed on the inner wall of the shaft hole 104'. At that time, to prevent the ridge line 213 formed at the boundary of the two inclined surfaces 212a and 212b from coming in contact with the flat surface 118', it is favorable for example that the boundary of the two adjacent inclined surfaces 212a and 212b is rounded, or the boundary portion of the two inclined surfaces 212a and 212b including the ridge line 213 is cut out or has a shape in which the two inclined surfaces 212a and 212b are adjacent through a flat surface 214.

Further, in the present embodiment, the two flat surfaces 21 are formed so as to keep the width-across-flat h at the end portion 22 of the input shaft 22, the end portion 22 of the input shaft 2 is directly connected to the rotation transmitting cushion 10, and the hub 4 is attached to the end of the output shaft 3. On the contrary, however, it is possible that the hub 4 is attached to the end portion 22 of the input shaft 2, two flat surfaces keeping the prescribed width-across-flat h are formed at the end portion of the output shaft 3, and the end portion of the output shaft 3 is directly connected to the rotation transmitting cushion 10. In that case, the first outer plate 11 is placed on the side of the output shaft 3, and the second outer plate 12 is placed on the side of the input shaft 2.

Further, in the present embodiment, the first outer plate 11 formed of hard resin is placed on the side of the input shaft 2, and the second outer plate 12 formed of an elastic member is placed on the side of the output shaft 3. On the contrary, however, it is possible that the second outer plate formed of an elastic member is placed on the side of the input shaft 2, and the first outer plate 11 formed of hard resin is placed on the side of the output shaft 3. In that case, in the second outer plate 12, a through-hole passing through between the one surface 122 and the other surface 121 is formed instead of the bottomed hole 124. And in the first outer plate 11, it is favorable to form, instead of the through-hole 114, a bottomed hole which has a bottom surface on the side of the hub 4 and has a cross-section shape similar to that of the through-hole 114.

Further, in the present embodiment, the first outer plate 11 and the second outer plate 12 are fixed by using the snap-fit portions 119. The present invention, however, is not limited to this. As a method of fixing both outer plates 11 and 12, it is possible to use widely other existing fixing methods such as one using an adhesive agent, one using screw clamping, and the like.

Further, in the present embodiment, the rotation transmitting cushion 10 is made so as to have the two-layer stacking structure consisting of the first outer plate 11 formed of hard resin and the second outer plate 12 formed of an elastic member having a lower elastic coefficient than that of the first outer plate 11. The present invention, however, is not limited to this. For example, the rotation transmitting cushion 10 may be formed of only the first outer plate 11. In that case, as a hole to which the end portion 22 of the input shaft 2 is inserted, it is favorable to form, instead of the through-hole 114, a bottomed hole which has a bottom surface on the side of the hub 4 and has a cross-section shape similar to that of the through-hole 114.

INDUSTRIAL APPLICABILITY

The present invention can be widely applied to a coupling that transmits torque applied to one rotating shaft to the other rotating shaft, such as a coupling for an electrically-assisted power steering device.

REFERENCE SIGNS LIST

1: direct-shaft-connection type coupling; 2: input shaft; 3: output shaft; 4: hub; 5: shaft connecting mechanism; 10: rotation transmitting cushion; 11: first outer plate; 12: second outer plate; 21: flat surface of the input shaft 2; 22: end portion of the input shaft 2; 42: cylindrical portion of the hub 4; 43, 44: end surface of the input shaft 2; 45: protruding portion of the hub 4; 46: inner periphery surface of the protruding portion 45; 101: boss portion of the rotation transmitting cushion 10; 102, 103: end surface of the boss portion 101; 103: boss portion of the rotation transmitting cushion 10; 104: bottomed shaft hole of the boss portion 101; 105: arm portion of the rotation transmitting cushion; 106: outer periphery surface of the boss portion 101; 110: plate body of the first outer plate 11; 111: the other surface of the first outer plate 11; 112: one surface of the first outer plate 11; 113, 113*a*: arm portion of the first outer plate 11; 114: through-hole of the plate body 110; 115: side surface of the plate body 110; 116: inner wall of the through-hole 114; 117: ridge line; 118: convex surface of the inner wall 116 of the through-hole 114; 118A, 118*a*-118*d*: inclined surface as a constitutive part of the convex surface 118; 119: snap-fit portion; 120: plate body of the second outer plate 12; 121: one surface of the second outer plate; 122: one surface of the second outer plate; 123, 123*a*, 123*b*: arm portion of the second outer plate; 124: bottomed hole of the plate body 120; 125: outer periphery of the plate body 120; 127: bottom of the bottomed hole 124: 128: buffer portion; 129: engaging portion for engaging with the snap-fit portion 119; 150: edge portion of the inner wall 116 along the axis O; and 151: central portion of the inner wall along the axis O.

The invention claimed is:

1. A rotation transmitting member which is attached to an end portion of a first shaft rotating around an axis and engages with a hub attached to an end portion of a second shaft rotating around the axis, the rotation transmitting member comprising:
   a first plate which is placed on a side of the first shaft, the first plate having a hole passing through the first plate in the direction of the axis; and
   a second plate which is placed on a side of the second shaft, the second plate having an elastic coefficient different from that of the first plate, the second plate having a hole leading to the hole of the first plate so that the holes formed in the first and second plates together form a shaft hole into which the end portion of the first shaft is inserted, the first shaft having a flat surface on an outer periphery surface of the end portion of the first shaft,
   wherein:
   on an inner wall of the hole formed in the plate having a larger elastic coefficient out of the first and second plates, there are formed two inclined surfaces which is opposed to the flat surface of the end portion of the first shaft, the inclined surfaces are inclined inward in a radial direction of the shaft hole from both sides of an area of the inclined surfaces toward a center of the area, along the axis, and the end portion of the first shaft is fitted into the hole of the plate having the larger elastic coefficient to result in a clearance fit; and
   on an inner wall of the hole formed in the plate having a smaller elastic coefficient out of the first and second plates, there is formed a flat surface which is opposed to the flat surface of the end portion of the first shaft, and the end portion of the first shaft is fitted into the hole of the plate having the smaller elastic coefficient such that there is no clearance between the flat surface of the inner wall and the flat surface of the end portion of the first shaft.

2. A direct-shaft-connection type coupling for transmitting torque from an input shaft to an output shaft, comprising: a rotation transmitting member of claim 1 attached to an end portion of a first shaft of the input shaft and the output shaft; and
   a hub attached to an end portion of a second shaft of the input shaft and the output shaft, the hub engaging with the rotation transmitting member.

3. A shaft connection mechanism, wherein: the shaft connection mechanism comprises:
   an input shaft;
   an output shaft; and
   a direct-shaft-connection type coupling of claim 2, which is attached to an end portion of a first shaft of the input shaft and the output shaft and which transmits torque from the input shaft to the output shaft; and a flat surface is formed on outer periphery surface of the end portion of the first shaft.

4. A rotation transmitting member of claim 1, wherein:
the second plate is a plate having a smaller elastic coefficient than that of the first plate, and
the hole formed in the second plate has a bottom which closes the hole from a side of the second shaft.

5. A rotation transmitting member of claim 4, wherein:
the second plate has a buffer means against the hub, on a surface on a side of the second shaft.

6. A rotation transmitting member of claim 5, further comprising:
a connection means which connects the first plate and the second plate.

7. A rotation transmitting member of claim 4, further comprising:
a connection means which connects the first plate and the second plate.

8. A rotation transmitting member of claim 1, wherein:
the second plate has a buffer means against the hub, on a surface on a side of the second shaft.

9. A rotation transmitting member of claim 8, further comprising:
a connection means which connects the first plate and the second plate.

10. A rotation transmitting member of claim 1, further comprising:
a connection means which connects the first plate and the second plate.

11. A rotation transmitting member which is attached to an end portion of a first shaft around an axis and engages with a hub attached to an end portion of a second shaft rotating around the axis, the rotation transmitting member comprising:
a first plate which is placed on a side of the one shaft, the first plate having a hole passing through the first plate in the direction of the axis; and
a second plate which is placed on a side of the other shaft, the second plate having a smaller elastic coefficient than that of the first plate, the second plate having a hole leading to the hole of the first plate,
the first shaft having a flat surface on an outer periphery surface of the end portion of the first shaft, the holes of the first and second plates together forming a shaft hole into which the end portion of the first shaft is inserted,
in an inner wall area of the shaft hole, there being formed two inclined surfaces which is opposed to the flat surface of the end portion of the first shaft, the inclined surfaces being inclined inward in a radial direction of the shaft hole from both sides of an area of the inclined surfaces toward a center of the area, along the axis,
the hole of the second plate having a bottom which closes the shaft hole from a side of the second shaft.

12. A rotation transmitting member of claim 11, wherein:
the second plate has a buffer means against the hub, on a surface on a side of the second shaft.

13. A rotation transmitting member of claim 12, further comprising:
a connection means which connects the first plate and the second plate.

14. A rotation transmitting member of claim 11, further comprising:
a connection means which connects the first plate and the second plate.

15. A rotation transmitting member which is attached to an end of a first shaft rotating around an axis and engages with a hub attached to an end of a second shaft rotating around the axis, the rotation transmitting member comprising:
a first plate which is placed on a side of the one shaft; and
a second plate which is placed on a side of the other shaft, the second plate having an elastic coefficient different from that of the first plate, the second plate having a buffer means against the hub, on a surface on a side of the second shaft,
wherein:
the rotation transmitting member has a shaft hole into which the first shaft having a flat surface on an outer periphery surface of the end portion of the first shaft is inserted; and
in an inner wall area of the shaft hole which is opposed to the flat surface, there are formed two inclined surfaces inclined inward in a radial direction of the shaft hole from both side portions to a center of the area, along the axis.

16. A rotation transmitting member of claim 15, further comprising:
a connection means which connects the first plate and the second plate.

17. A rotation transmitting member which is attached to an end of a first shaft rotating around an axis and engages with a hub attached to an end of a second shaft rotating around the axis, the rotation transmitting member comprising:
a first plate which is placed on a side of the one shaft;
a second plate which is placed on a side of the other shaft, the second plate having an elastic coefficient different from that of the first plate; and
a connection means which connects the first plate and the second plate,
wherein:
the rotation transmitting member has a shaft hole into which the first shaft having a flat surface on an outer periphery surface of the end portion of the first shaft is inserted; and
in an inner wall area of the shaft hole which is opposed to the flat surface, there are formed two inclined surfaces inclined inward in a radial direction of the shaft hole from both side portions to a center of the area, along the axis.

18. A shaft connection mechanism comprising:
first and second shafts both rotating about an axis; and
a direct-shaft-connection type coupling for transmitting torque between the first and second shafts the direct-shaft-connection type coupling comprising:
a rotation transmitting member attached to an end of the first shaft; and
a hub attached to an end of the second shaft, the hub engaging with the rotation transmitting member;
the rotation transmitting member comprising:
a first plate placed on a side of the first shaft, the first plate having a hole passing through the first plate in the direction of the axis; and
a second plate placed on a side of the second shaft, the second plate having an elastic coefficient different from that of the first plate, the second plate having a hole leading to the hole of the first plate, the holes formed in the first and second plates together forming a shaft hole, the end portion of the first shaft being inserted into the shaft hole,
wherein:
a flat surface is formed on an inner wall of the shaft hole; and
in an area of an outer periphery surface of the end portion of the first shaft, the area being opposed to the flat surface formed on the inner wall of the shaft hole, there are formed two inclined surfaces inclined outward in a radial direction of the first shaft from both side portions of the area to a center of the area, along the axis;

the end portion of the first shaft is fitted into the hole of the plate having a larger elastic coefficient out of the first and second plates by a clearance fit; and the end portion of the first shaft is in contact with an inner wall of the hole of the plate having a smaller elastic coefficient out of the first and second plates.

\* \* \* \* \*